Jan. 11, 1927. 1,613,754
F. A. HOWARD ET AL
CONTINUOUS DISTILLATION OF OILS
Filed June 15, 1922
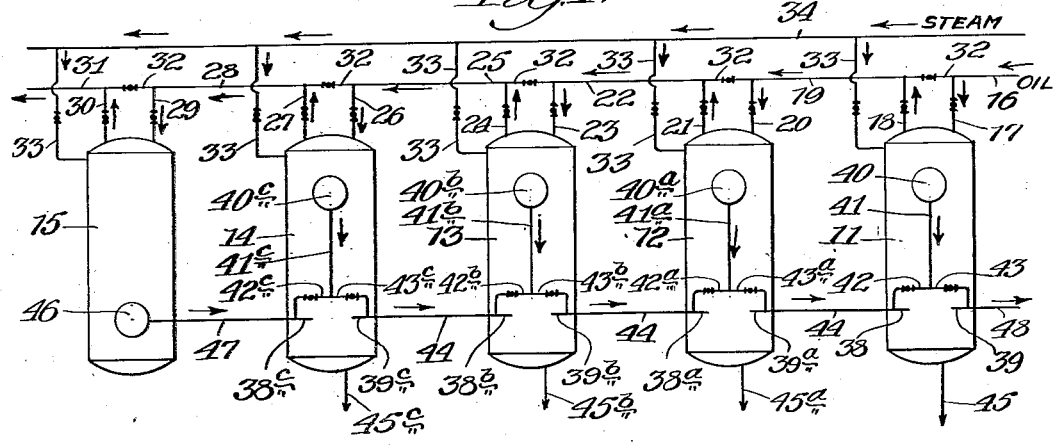
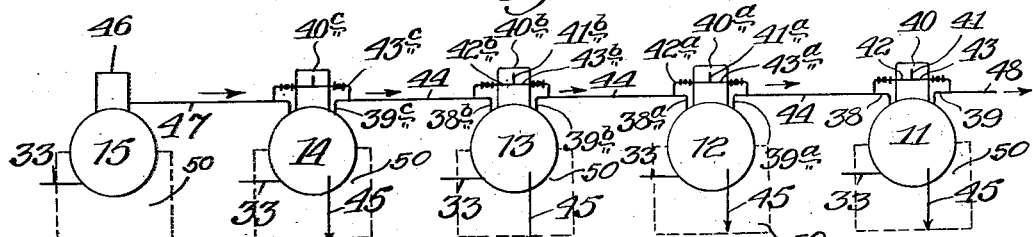
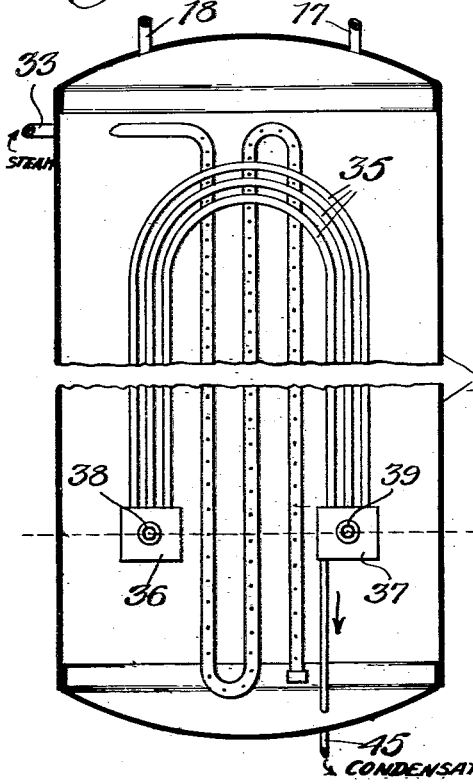
Inventors
Frank A. Howard,
Nathaniel E. Loomis,
By Dyrenforth, Lee, Chritton and Wiles,
Attys.

Patented Jan. 11, 1927.

1,613,754

UNITED STATES PATENT OFFICE.

FRANK A. HOWARD AND NATHANIEL E. LOOMIS, OF ELIZABETH, NEW JERSEY, ASSIGNORS TO STANDARD DEVELOPMENT COMPANY, A CORPORATION OF DELAWARE.

CONTINUOUS DISTILLATION OF OILS.

Application filed June 15, 1922. Serial No. 568,457.

The present invention relates to the distillation of hydrocarbon oils, and more particularly to the continuous distillation or reduction of oil in the presence of steam. It will be fully understood from the following description, illustrated by the accompanying drawing, in which—

Figure 1 shows diagrammatically and in plan an arrangement of stills suitable for use in connection with the present invention;

Fig. 2 shows, also diagrammatically, in end elevation the arrangement of stills of Fig. 1;

Fig. 3 is a broken horizontal section through one of the stills used in connection with the present invention; and Fig. 4 shows a vertical section through one of the stills employed in connection with the present invention on the line 4 of Fig. 3.

Referring more particularly to the drawings, the numerals 11, 12, 13, 14 and 15 indicate successive stills on a continuous battery of stills, each provided with a suitable fired setting, as indicated diagrammatically at 50 in Fig. 2. These stills may be of any suitable construction and are indicated as being of the horizontal cylindrical type. They may be set at successively lower levels in the manner usual in the art to provide as far as possible for a gravity flow of oil through the several stills. As the setting of the stills is not a part of the present invention, it is not indicated in the drawings.

The oil to be distilled, which may suitably be, for example, a Pennsylvania or mid-continent crude, may, if desired, be initially preheated and is fed from line 16 into valved line 17 entering still 11. Residue from still 11 passes out through valved line 18 into line 19, from which valved line 20 leads into still 12. Similarly, residue passes from still 12 through valved line 21 and line 22 into valved line 23 leading into still 13. From still 13 residue passes through valved line 24 and line 25 into valved line 26 leading into still 14. From still 14 residue passes through valved line 27 and line 28 into valved line 29 leading into still 15. From still 15 the tar or residue passes through valved line 30 into line 31, which may lead to a suitable tar cooler (not shown). Valved by-passes 32 are provided for by-passing any one of the stills, if desired. Steam is supplied into the stills through valved lines 33 leading from the steam manifold 34.

As shown in Figures 3 and 4, each of the stills 11, 12, 13 and 14 is provided internally with an indirect heat exchanger, preferably of the tubular type. In Figures 3 and 4 still 11 is shown in horizontal and vertical section, respectively. The indirect heat exchanger may suitably be of the tubular type. In the embodiment shown the tubes 35 are curved in U-shape, and terminate in headers 36 and 37, respectively. A vapor line 38 passes through the wall of the still and opens into the header 36. Vapor line 39 likewise passes through the wall of the still and opens into header 37. Each of the stills 11, 12, 13 and 14 is provided with a vapor dome, indicated in connection with still 11 by numeral 40. From this dome a vapor line 41 extends and is provided with two valved branches 42 and 43, one connecting with vapor line 38 and the other with vapor line 39. Similar parts in stills 12, 13 and 14 are indicated by the same numerals with the suffixes "a", "b" and "c", respectively.

On referring to Figures 1 and 2, it will be noted that the vapor lines 39 from stills 12, 13 and 14, are connected by suitable lines 44 with the vapor lines 38 of stills 11, 12 and 13, respectively.

From the header 37 of the exchanger in each still a condensate line 45 passes to the exterior of the still to any suitable cooling and receiving devices (not shown). Still 15 is provided with a vapor dome 46, from which a vapor line 47 connects with the line 38°, leading into the heat exchanger in still 14.

In operating a battery of stills of the character shown in the present drawings, the oil to be treated, for example, Pennsylvania crude, is passed successively through the stills, beginning with still 11. Any desired temperature gradient may be maintained between the stills, for example, with a battery of 5 stills as illustrated, the temperature difference between successive stills may be from 50 to 150° F. As is well known in the art, with continuous batteries containing a greater number of stills, a smaller temperature gradient between stills is maintained.

For purposes of illustration, in a battery such as that illustrated in the drawings, the temperature maintained in still 11 may be about 350° F., in still 12 about 450° F., in still 13 about 550° F., in still 14 about 650° F., and in still 15 about 720° F. The steam injected into the stills is varied in accordance with the result desired in each still.

It will be seen from the drawings that the vapors from still 15, the last of the series, pass directly into the tubular heat exchanger within the next preceding still 14. The vapors from stills 14, 13 and 12 may be passed, by means of the proper connections, either into the exchanger in the same still from which they are evolved or into the exchanger in the next preceding still. The vapors from the first still 11 may be passed either into the exchanger in still 11 or may pass through connection 43 into the vapor discharge line 48, which likewise receives the vapors of the preceding stills passing out of the exchanger in still 11.

In one mode of operation in accordance with the present invention, the connections 42, 42$^a$, 42$^b$ and 42$^c$ are closed. The vapors from still 15 then pass into the exchanger in still 14, wherein they are partially condensed. The vapors from still 14, together with those uncondensed in the exchanger in that still pass through line 44 into the exchanger in still 13, in which a further partial condensation takes place. The vapors from still 13 and those uncondensed in the exchanger in still 13 pass into the exchanger in still 12. Similarly, the vapors formed in still 12, together with those passing through the exchanger in still 12, enter the exchanger in still 11. The vapors from still 11 together with those uncondensed in the exchanger in still 11 pass through line 48 to any suitable condensing and receiving devices.

In operating in the manner just described, the vapors from each still are subjected to a controlled and moderate cooling action in the exchanger in the next preceding still, the temperature gradient being suitably from 50 to 150° F., the same as that between the stills. In this way a very clean fractionation of the vapors may be secured. Light naphtha, steam and gas will, for example, issue from vapor line 48; heavier naphtha will be condensed in the exchanger in still 11 and will issue through discharge line 45; refined oil will be condensed in the exchanger in still 12 and will be discharged through line 45$^a$; gas oil will be condensed in the exchanger in still 13 and will issue through discharge line 45$^b$ and paraffin distillate will be condensed in the exchanger in still 14 and will issue through the line 45$^c$.

In carrying out the present invention, the vapors from each still may also be passed into the exchanger in the same still from which they are evolved, subsequently passing to the exchangers in the next preceding still.

In operating in this manner, the valves in the lines 43, 43$^a$, 43$^b$ and 43$^c$ are closed and those in the lines 42, 42$^a$, 42$^b$ and 42$^c$ are opened. The vapors from still 15 then pass into the exchanger in still 14, and are joined by the vapors from still 14, which enter the same exchanger through lines 41$^c$ and 42$^c$. Uncondensed vapors from the exchanger in still 14 pass into the exchanger in still 13, accompanied by vapors from the still 13. Similarly, uncondensed vapors from the exchanger in still 13 and vapors from the still 12 enter the exchanger in still 12 and uncondensed vapors from the latter together with vapors from still 11 enter the exchanger in still 11. Uncondensed vapors from the exchanger in still 11 then pass out through the vapor line 48 to suitable condensers.

In operating in the last described manner it is apparent that the vapors issuing from each of the stills in passing through the exchangers in the same still, deposit any entrained oil that may be carried over, which is blended with condensate from the vapors from the next still in the case of still 14 and from the exchanger in the next still in the cases of stills 11, 12 and 13. The desirability of this mode of operation, of course, depends upon the character of products desired and the nature of the oil being distilled.

We claim:

1. In apparatus for the distillation of oil, a still, a heat exchanger within the still, means for conducting vapors from the exterior of the still to the heat exchanger, means for conducting uncondensed vapors from the heat exchanger to the exterior of the still, a discharge line for vapors evolved in the still and valved means for connecting said discharge line with each of said conducting means.

2. In apparatus for the distillation of oil, a series of stills, means for conducting oil successively through said stills, heat exchangers in all of the stills except the last still, means for conducting vapors evolved in each still beyond the first still to the heat exchanger in the preceding still, means for conducting vapors from each said heat exchangers except that in the first still to the heat exchanger in the preceding still, and means for conducting vapors from each still except the last still to the heat exchanger in the same still.

3. In apparatus for the distillation of oils, a plurality of stills, means for passing oil successively through said stills, a heat exchanger in each of said stills, a conduit for admitting vapors from the exterior of each still to the heat exchanger within the still, a conduit for discharging uncondensed vapors from the heat exchanger in each still to the exterior of the still, a conduit for the discharge of vapors evolved in each still, valve connections between said last mentioned conduit and each conduit connected with the heat exchanger in the same still, and conduits connecting the discharge conduit from the heat exchanger of each still to the inlet conduit to the heat exchanger of the preceding still.

4. In apparatus for the distillation of oil, a still, a heat exchanger entirely within the still, said heat exchanger comprising a plurality of U-shaped tubes extending in one direction of the still, headers for the respective ends of said tubes, conduits extending from the exterior of the still to each of said headers, a vapor outlet from the still, and valved connections between said outlet and each of said conduits.

5. The method of distilling oil which comprises passing oil successively through a series of stills maintained at successively higher temperatures, applying heat externally of the still, passing the vapors formed in each still successively through heat exchangers in the preceding stills, the vapors from each still admixing with the vapors from the succeeding still entering the heat exchanger in the former still.

FRANK A. HOWARD.
NATHANIEL E. LOOMIS.